United States Patent
Yoshino et al.

(10) Patent No.: US 11,850,690 B2
(45) Date of Patent: Dec. 26, 2023

(54) METHOD FOR MANUFACTURING ENGINE POPPET VALVE

(71) Applicant: NITTAN Corporation, Hadano (JP)

(72) Inventors: Ryoichi Yoshino, Ninomiya-machi (JP); Daiki Sato, Hadano (JP); Yuki Sasagawa, Hiratsuka (JP)

(73) Assignee: NITTAN Corporation, Hadano (JP)

( * ) Notice: Subject to any disclaimer, the term of this patent is extended or adjusted under 35 U.S.C. 154(b) by 0 days.

(21) Appl. No.: 17/936,389

(22) Filed: Sep. 29, 2022

(65) Prior Publication Data
US 2023/0017343 A1   Jan. 19, 2023

Related U.S. Application Data

(63) Continuation-in-part of application No. PCT/JP2020/014635, filed on Mar. 30, 2020.

(51) Int. Cl.
*B23P 15/00* (2006.01)

(52) U.S. Cl.
CPC ....... *B23P 15/002* (2013.01); *Y10T 29/49298* (2015.01)

(58) Field of Classification Search
CPC ................ B23P 15/002; Y10T 29/49298
See application file for complete search history.

(56) References Cited

U.S. PATENT DOCUMENTS 1,356,311 A   10/1920 Reilly
1,402,720 A   1/1922 Bartlett
(Continued)

FOREIGN PATENT DOCUMENTS

CN   203700465   7/2014
DE   718717   3/1942
(Continued)

OTHER PUBLICATIONS

International Search Report dated Nov. 11, 2008 in Intl App No. PCT/JP2008/068498 filed on Oct. 10, 2008, the national stage of which was U.S. Appl. No. 112516963, filed Oct. 10, 2008, now U.S. Pat. No. 8,230,834 B2 on Jul. 31, 2012, and which published as WO 2010/041337 A1 on Apr. 15, 2010 and as US 2011 0186000 A1 on Aug. 4, 2011.

(Continued)

*Primary Examiner* — Sarang Afzali
(74) *Attorney, Agent, or Firm* — JTT Patent Services, LLC; Gerald T. Peters

(57) ABSTRACT

A method for manufacturing an engine poppet valve comprising a valve head portion manufacturing operation in which hot forging is employed to form a stem/head intermediate product; a stepped stem portion manufacturing operation in which cold drawing is employed to cause a stepped stem portion comprising a first stem portion which has been made to be of decreased diameter, a step portion which has been formed by a stem member inlet surface, and a second stem portion in which there is absence of decrease in diameter and which is continuous by way of the step portion with the first stem portion to be formed from an intermediate stem portion; and a joining operation in which a stem end portion having a same outside diameter as the first stem portion is joined to a base end portion of the first stem portion.

3 Claims, 3 Drawing Sheets

(56) References Cited

U.S. PATENT DOCUMENTS

| | | |
|---|---|---|
| 1,414,997 A | 5/1922 | Zinn |
| 1,670,965 A | 5/1928 | Heron |
| 1,714,690 A | 5/1929 | Nevins |
| 1,727,621 A | 9/1929 | Taub |
| 1,809,201 A | 6/1931 | Higgins |
| 1,914,340 A | 6/1933 | Holzwarth |
| 1,984,728 A | 12/1934 | Colwell |
| 1,984,751 A | 12/1934 | McBride et al. |
| 2,009,996 A | 8/1935 | Gering, Jr. |
| 2,086,420 A | 7/1937 | Jardine |
| 2,119,042 A | 5/1938 | Charlton |
| 2,183,254 A | 12/1939 | Charlton |
| 2,238,628 A | 4/1941 | Daisley |
| 2,274,667 A | 3/1942 | Colwell |
| 2,276,552 A | 3/1942 | Weber, Jr. |
| 2,280,758 A | 4/1942 | Voorhies |
| 2,365,285 A | 12/1944 | McDill |
| 2,369,063 A | 2/1945 | McDill |
| 2,371,548 A | 3/1945 | Saffady |
| 2,378,729 A * | 6/1945 | Schmidt .................. B21C 1/22 72/274 |
| 2,392,175 A | 1/1946 | Norton |
| 2,403,926 A | 7/1946 | Thompson |
| 2,407,561 A | 9/1946 | Lincoln |
| 2,410,190 A | 10/1946 | Townhill |
| 2,411,764 A | 11/1946 | Thoren |
| 2,435,948 A | 2/1948 | Wischhusen |
| 2,439,240 A | 4/1948 | Cummings |
| 2,450,803 A | 10/1948 | Johnson |
| 2,452,628 A | 11/1948 | Bartlett et al. |
| 2,453,642 A | 11/1948 | Emil |
| 2,471,937 A | 5/1949 | Colwell |
| 2,544,605 A | 3/1951 | Mallory |
| 2,627,259 A | 2/1953 | Wood et al. |
| 2,636,255 A | 4/1953 | Jeudy |
| 2,668,719 A | 2/1954 | Harmon |
| 2,682,261 A | 6/1954 | Achor |
| 2,698,754 A | 1/1955 | Bernstein |
| 2,731,708 A | 1/1956 | Kubera |
| 2,734,008 A | 2/1956 | Kirkpatrick et al. |
| 2,736,560 A | 2/1956 | Meibuhr |
| 2,798,831 A | 7/1957 | Willcox |
| 2,948,052 A | 8/1960 | Kubera |
| 2,949,907 A | 8/1960 | Tauschek |
| RE24,903 E | 12/1960 | Smith |
| 2,966,363 A | 12/1960 | Hendrickson |
| 3,132,871 A | 5/1964 | Stewart |
| 3,313,277 A | 4/1967 | Adolfsson et al. |
| 3,395,927 A | 8/1968 | Hammond |
| 3,426,741 A | 2/1969 | Haagen |
| 3,659,863 A | 5/1972 | Buttner |
| 3,710,773 A | 1/1973 | Piesch et al. |
| 3,826,301 A | 7/1974 | Brooks |
| 4,147,138 A | 4/1979 | Haug |
| 4,191,558 A | 3/1980 | Gould |
| 4,300,492 A | 11/1981 | Bart |
| 4,346,870 A | 8/1982 | Chute et al. |
| 4,351,292 A | 9/1982 | Worthen et al. |
| 4,362,134 A | 12/1982 | Worthen et al. |
| 4,693,088 A | 9/1987 | Latge |
| 4,726,717 A | 2/1988 | Schmid |
| 4,741,080 A | 5/1988 | Larson et al. |
| 4,762,447 A | 8/1988 | Marantette |
| 4,834,036 A | 5/1989 | Nishiyama |
| 5,056,219 A | 10/1991 | Iwase |
| 5,077,876 A | 1/1992 | McConkey |
| 5,168,843 A | 12/1992 | Franks |
| 5,297,746 A | 3/1994 | McBride |
| 5,346,184 A | 9/1994 | Ghosh |
| 5,358,212 A | 10/1994 | Soltys |
| 5,381,847 A | 1/1995 | Ashok |
| 5,413,073 A | 5/1995 | Larson et al. |
| 5,458,314 A | 10/1995 | Bonesteel |
| 5,611,306 A | 3/1997 | Takano |
| 5,619,796 A | 4/1997 | Larson et al. |
| 5,649,358 A | 7/1997 | Adachi |
| 5,765,520 A | 6/1998 | Adachi |
| 5,769,037 A | 6/1998 | Ohtsubo et al. |
| 5,771,852 A | 6/1998 | Heimann, Jr. |
| 5,823,158 A | 10/1998 | Heimann, Jr. et al. |
| 5,957,467 A | 9/1999 | Hornung |
| 6,073,912 A | 6/2000 | Mori et al. |
| 6,086,652 A | 7/2000 | Mulvaney, III |
| 6,105,261 A | 8/2000 | Ecer |
| 6,138,351 A | 10/2000 | Adachi |
| 6,263,849 B1 | 7/2001 | Bonesteel et al. |
| 6,378,543 B1 | 4/2002 | Murayama |
| 6,679,478 B2 | 1/2004 | Murayama |
| 6,688,207 B2 | 2/2004 | Tabeling |
| 6,910,618 B2 * | 6/2005 | Gendron ................. E21B 17/08 72/58 |
| 6,912,984 B2 | 7/2005 | Narasimhan et al. |
| 6,951,579 B2 | 10/2005 | Koyama |
| 7,160,468 B2 | 1/2007 | Matsuzaki |
| 7,311,068 B2 | 12/2007 | Jackson |
| 7,344,655 B1 | 3/2008 | Nishii et al. |
| 8,230,834 B2 | 7/2012 | Endo |
| 8,522,434 B2 * | 9/2013 | Yoshimura ......... B23K 11/0935 29/888.45 |
| 8,713,793 B2 * | 5/2014 | Morii .................... B21K 21/16 72/352 |
| 8,881,391 B2 | 11/2014 | Morii |
| 9,061,389 B2 | 6/2015 | Uchiuzo |
| 9,175,788 B2 | 11/2015 | Onuma et al. |
| 9,255,559 B2 | 2/2016 | Kroos |
| 9,284,911 B2 | 3/2016 | Tomita |
| 9,302,317 B2 | 4/2016 | Morii et al. |
| 9,427,795 B2 | 8/2016 | Morii et al. |
| 9,611,953 B2 | 4/2017 | Tsuneishi |
| 9,689,506 B2 | 6/2017 | Homma et al. |
| 9,751,164 B2 | 9/2017 | Ishii et al. |
| 9,790,822 B2 | 10/2017 | Tsuneishi et al. |
| 9,840,948 B2 | 12/2017 | Yokoyama et al. |
| 9,920,663 B2 | 3/2018 | Tsuneishi |
| 10,287,933 B2 | 5/2019 | Ikemi et al. |
| 10,316,390 B2 | 6/2019 | Uchida et al. |
| 10,526,933 B2 * | 1/2020 | Morii ........................ F01L 3/20 |
| 10,569,318 B2 | 2/2020 | Takahashi et al. |
| 10,710,153 B2 | 7/2020 | Uchida et al. |
| 10,799,957 B2 | 10/2020 | Okuno |
| 11,260,448 B2 | 3/2022 | Matthias et al. |
| 11,300,018 B2 | 4/2022 | Kunitake et al. |
| 11,536,167 B2 * | 12/2022 | Kunitake ................. F01L 3/14 |
| 2002/0036280 A1 | 3/2002 | Murayama |
| 2004/0112327 A1 | 6/2004 | Spiegel |
| 2004/0261746 A1 | 12/2004 | Narasimhan et al. |
| 2005/0252338 A1 | 11/2005 | Henmi |
| 2006/0162686 A1 | 7/2006 | Teigl |
| 2007/0089471 A1 | 4/2007 | Ptaki |
| 2007/0240696 A1 | 10/2007 | Jackson |
| 2007/0241302 A1 | 10/2007 | Kishihara et al. |
| 2008/0006793 A1 | 1/2008 | Hirnschal |
| 2009/0020082 A1 | 1/2009 | Suzuki et al. |
| 2009/0206559 A1 | 8/2009 | Nguyen |
| 2009/0266314 A1 | 10/2009 | Uchiyama et al. |
| 2010/0107719 A1 * | 5/2010 | Geho ..................... B21D 45/02 72/470 |
| 2010/0126319 A1 | 5/2010 | Mader |
| 2010/0269778 A1 | 10/2010 | Yuen |
| 2011/0030526 A1 | 2/2011 | Miyazaki |
| 2011/0174259 A1 | 7/2011 | Yoshimura |
| 2011/0186000 A1 | 8/2011 | Endo |
| 2012/0042859 A1 | 2/2012 | Sakai |
| 2012/0124844 A1 | 5/2012 | Droese |
| 2012/0246934 A1 | 10/2012 | Morii |
| 2012/0246936 A1 | 10/2012 | Morii |
| 2012/0255175 A1 | 10/2012 | Morii et al. |
| 2012/0304464 A1 | 12/2012 | Morii |
| 2013/0019474 A1 | 1/2013 | Maruyama et al. |
| 2014/0014057 A1 | 1/2014 | McGinnis |
| 2014/0290617 A1 | 10/2014 | Tomita |
| 2014/0352803 A1 | 12/2014 | Onuma et al. |
| 2014/0366373 A1 | 12/2014 | Morii |
| 2015/0232964 A1 | 8/2015 | Zhang |

(56) References Cited

U.S. PATENT DOCUMENTS

| | | |
|---|---|---|
| 2015/0240675 A1 | 8/2015 | Homma et al. |
| 2015/0354727 A1 | 12/2015 | Tsuneishi |
| 2016/0053641 A1 | 4/2016 | Tsuneishi |
| 2016/0186620 A1 | 6/2016 | Knudsen |
| 2016/0256965 A1 | 9/2016 | Ishii et al. |
| 2016/0279746 A1 | 9/2016 | Mishima et al. |
| 2016/0326919 A1 | 11/2016 | Ikemi et al. |
| 2016/0348546 A1 | 12/2016 | Kurahashi et al. |
| 2016/0356186 A1 | 12/2016 | Tsuneishi et al. |
| 2017/0234175 A1 | 8/2017 | Morii et al. |
| 2017/0276031 A1 | 9/2017 | Yokoyama et al. |
| 2018/0104730 A1 | 4/2018 | Takahashi et al. |
| 2018/0142324 A1 | 5/2018 | Uchida et al. |
| 2019/0030595 A1 | 1/2019 | Uchida et al. |
| 2019/0240743 A1 | 8/2019 | Okuno |
| 2021/0003044 A1 | 1/2021 | Kunitake et al. |

FOREIGN PATENT DOCUMENTS

| | | | | |
|---|---|---|---|---|
| DE | 2240572 | 2/1974 | | |
| DE | 2727006 A1 | 12/1978 | | |
| DE | 19826885 A1 | 12/1999 | | |
| DE | 202016004635 | 8/2016 | | |
| DE | 102015220891 A1 | 11/2021 | | |
| EP | 0619419 A1 | 3/1994 | | |
| EP | 0911493 A2 | 4/1999 | | |
| EP | 1070831 A2 | 1/2001 | | |
| EP | 1152127 A1 | 11/2001 | | |
| EP | 1353044 A2 | 10/2003 | | |
| EP | 1462621 A1 | 9/2004 | | |
| FR | 490855 | 5/1919 | | |
| JP | S52-073306 U | 6/1977 | | |
| JP | S52-111813 U | 8/1977 | | |
| JP | S55-025679 U | 2/1980 | | |
| JP | S59-023856 A | 2/1984 | | |
| JP | S60-087314 U | 6/1985 | | |
| JP | S60-097213 U1 | 7/1985 | | |
| JP | S61-042208 U1 | 3/1986 | | |
| JP | S61-084347 A | 4/1986 | | |
| JP | S61-106677 U | 7/1986 | | |
| JP | S62-062071 A | 3/1987 | | |
| JP | S62-102806 U | 6/1987 | | |
| JP | 620179846 A | * 8/1987 | ............... | B21K 1/22 |
| JP | S63-033167 A | 2/1988 | | |
| JP | S63-109207 A | 5/1988 | | |
| JP | S63-264237 A | 11/1988 | | |
| JP | S64-083676 A | 3/1989 | | |
| JP | H01-037466 B2 | 8/1989 | | |
| JP | H1-173305 U | 12/1989 | | |
| JP | H01-173417 U | 12/1989 | | |
| JP | H02-005704 A | 1/1990 | | |
| JP | H02-124204 A | 5/1990 | | |
| JP | H02-020411 Y2 | 6/1990 | | |
| JP | H02-033848 B2 | 7/1990 | | |
| JP | H02-124204 U | 10/1990 | | |
| JP | H03-018605 A | 1/1991 | | |
| JP | H03-023607 U | 3/1991 | | |
| JP | H03-052309 U | 5/1991 | | |
| JP | H03-170210 A | 7/1991 | | |
| JP | 1991-242408 A | 10/1991 | | |
| JP | 1991-258903 A | 11/1991 | | |
| JP | H04-065907 U | 6/1992 | | |
| JP | H4-76907 U | 7/1992 | | |
| JP | H04-232318 B2 | 8/1992 | | |
| JP | H04-272413 A | 9/1992 | | |
| JP | 1992-314906 A | 11/1992 | | |
| JP | H04-311611 A | 11/1992 | | |
| JP | H05-071316 A | 3/1993 | | |
| JP | H5-141214 A | 6/1993 | | |
| JP | H06-299816 A | 10/1994 | | |
| JP | H06-096177 B2 | 11/1994 | | |
| JP | H07-204909 A | 8/1995 | | |
| JP | H07-279627 A | 10/1995 | | |
| JP | H08-176752 A | 7/1996 | | |
| JP | 2789390 B2 | 8/1998 | | |
| JP | H11-032525 A | 2/1999 | | |
| JP | H11-117718 A | 4/1999 | | |
| JP | H11-210429 A | 8/1999 | | |
| JP | 2000-045730 A | 2/2000 | | |
| JP | 3018260 B2 | 3/2000 | | |
| JP | 2001-059408 A | 3/2001 | | |
| JP | 2001-234714 A | 8/2001 | | |
| JP | 2001-323323 A | 11/2001 | | |
| JP | 2002-292164 A | 10/2002 | | |
| JP | 2003-103355 A | 4/2003 | | |
| JP | 2003-307105 A | 10/2003 | | |
| JP | 2004-106109 A | 4/2004 | | |
| JP | 2004-301124 A | 10/2004 | | |
| JP | 2004-306204 A | 11/2004 | | |
| JP | 2006-002578 A | 1/2006 | | |
| JP | 2006-097498 A | 4/2006 | | |
| JP | 2006-097499 A | 4/2006 | | |
| JP | 2006-516313 A | 6/2006 | | |
| JP | 2006-183528 A | 7/2006 | | |
| JP | 2006-274917 A | 10/2006 | | |
| JP | 2007-285186 A | 11/2007 | | |
| JP | 2008-014237 A | 1/2008 | | |
| JP | 2008-088815 A | 4/2008 | | |
| JP | 2008-138649 A | 6/2008 | | |
| JP | 4227551 B2 | 2/2009 | | |
| JP | 4390291 B1 | 10/2009 | | |
| JP | 2011-157845 A | 8/2011 | | |
| JP | 2011-179327 A | 9/2011 | | |
| JP | 2011-179328 A | 9/2011 | | |
| JP | 2011-184260 A | 9/2011 | | |
| JP | 2011-236838 A | 11/2011 | | |
| JP | 2012-072748 A | 4/2012 | | |
| JP | 2012-112358 A | 6/2012 | | |
| JP | 2012-136978 A | 7/2012 | | |
| JP | 2012-136979 A | 7/2012 | | |
| JP | 2012-197718 A | 10/2012 | | |
| JP | 2013-112550 A | 6/2013 | | |
| JP | 2013-155676 A | 8/2013 | | |
| JP | 2013-180536 A | 9/2013 | | |
| JP | 2015-036171 A | 2/2015 | | |
| JP | 5735721 B1 | 6/2015 | | |
| JP | 2016-047537 A | 4/2016 | | |
| JP | 2017-008835 A | 1/2017 | | |
| JP | 2017-190759 A | 11/2021 | | |
| KR | 20-1996-0023080 U | 7/1996 | | |
| WO | 2000047876 A1 | 8/2000 | | |
| WO | 2007057946 A1 | 5/2007 | | |
| WO | 2010041337 A1 | 4/2010 | | |
| WO | 2010119977 A1 | 10/2010 | | |
| WO | 2011104912 A1 | 9/2011 | | |
| WO | 2011104916 A1 | 9/2011 | | |
| WO | 2011104923 A1 | 9/2011 | | |
| WO | 2012026011 A1 | 3/2012 | | |
| WO | 2012086315 A1 | 6/2012 | | |
| WO | 2012086316 A1 | 6/2012 | | |
| WO | 2013080389 A1 | 6/2013 | | |
| WO | 2013145250 A1 | 10/2013 | | |
| WO | 2014054113 A1 | 4/2014 | | |
| WO | 2014054302 A1 | 4/2014 | | |
| WO | 2014054613 A1 | 4/2014 | | |
| WO | 2014122858 A1 | 8/2014 | | |
| WO | 2014141416 A1 | 9/2014 | | |
| WO | 2014155665 A1 | 10/2014 | | |
| WO | 2014155667 A1 | 10/2014 | | |
| WO | 2014167694 A1 | 10/2014 | | |
| WO | 2015075795 A1 | 5/2015 | | |
| WO | 2015098643 A1 | 7/2015 | | |
| WO | 2015118690 A1 | 8/2015 | | |
| WO | 2015170384 A1 | 11/2015 | | |
| WO | WO-2016031455 A1 | * 3/2016 | ............... | B21K 1/22 |
| WO | 2014147759 A1 | 2/2017 | | |
| WO | 2015121920 A1 | 3/2017 | | |
| WO | 2017072885 A1 | 5/2017 | | |
| WO | 2017130375 A1 | 8/2017 | | |
| WO | 2017130376 A1 | 8/2017 | | |
| WO | 2017141305 A1 | 8/2017 | | |
| WO | 2018105009 A1 | 6/2018 | | |

(56) References Cited

FOREIGN PATENT DOCUMENTS

| WO | 2019180806 A1 | 9/2019 | | |
|---|---|---|---|---|
| WO | 2020 100185 A1 | 5/2020 | | |
| WO | WO-2020100185 A1 * | 5/2020 | ............ | B21D 22/16 |

OTHER PUBLICATIONS

International Search Report dated Nov. 13, 2012 in Intl App No. PCT/JP2012/075452 filed on Oct. 2, 2012, the national stage of which was U.S. Appl. No. 14/361,636, filed Oct. 2, 2012, now U.S. Pat. No. 9,175,788 on Nov. 3, 2015, and which published as WO 2014/054113 A1 on Apr. 10, 2014 and as US 2014 0352803 A1 on Dec. 4, 2014.
International Search Report dated Mar. 25, 2014 in Intl App No. PCT/JP2014/053086 filed on Feb. 10, 2014, the national stage of which was U.S. Appl. No. 15/114,460, filed Feb. 10, 2014, now U.S. Pat. No. 9,790,822 B2 on Oct. 17, 2017, and which published as WO 2015 118690 A1 on Aug. 13, 2015 and as US 2016 0356186 A1 on Dec. 8, 2016.
International Search Report of Feb. 14, 2017 in Intl App No. PCT/JP2016/086076 filed on Dec. 5, 2016, the national stage of which was U.S. Appl. No. 16/340,871, filed Dec. 5, 2016, now U.S. Pat. No. 10,799,957 B2 on Oct. 13, 2020, and which published as WO 2018 105009 A1 on Jun. 14, 2018 and as US 2019 0240743 A1 on Aug. 8, 2019.
International Search Report and Written Opinion of the International Searching Authority dated May 10, 2016 in Intl App No. PCT/JP2016/052635 filed on Jan. 29, 2016, the national stage of which was U.S. Appl. No. 15/564,332, filed Jan. 29, 2016, now U.S. Pat. No. 10,316,390 B2 on Jun. 11, 2019, and which published as WO 2017 130375 A1 on Aug. 3, 2017 and as US 2018 0142324 A1 on May 24, 2018.
International Search Report and Written Opinion in Intl App No. PCT/JP2016/052636 filed on Jan. 29, 2016 and published as WO 2017 130376 A1 dated Aug. 3, 2017.
Written Opinion of the International Searching Authority dated May 17, 2016 in Intl App No. PCT/JP2016/054252 filed on Feb. 15, 2016, the national stage of which was U.S. Appl. No. 15/540,930, filed Feb. 15, 2016, now U.S. Pat. No. 10,569,318 B2 on Feb. 25, 2020, and which published as WO 2017 141305 A1 on Aug. 24, 2017 and as US 2018 0104730 A1 on Apr. 19, 2018.
International Search Report dated Feb. 21, 2006 in Intl App No. PCT/JP2005/020975 filed on May 12, 2008 and published as WO 2007/057946 A1.
International Search Report dated May 7, 2013 in Intl App No. PCT/JP2013/058883 filed on Mar. 26, 2013 and published as WO 2014 054302 A1 on Apr. 10, 2014.
International Search Report dated May 7, 2013 in Intl App No. PCT/JP2013/057133 filed on Mar. 14, 2013 and published as WO 2014 141416 A1 on Sep. 18, 2013.
International Search Report dated Jun. 4, 2013 in Intl App No. PCTJP2013060977 filed on Apr. 11, 2013 and published as WO 2014 167694 A1.
International Search Report dated Mar. 25, 2014 in Intl App No. PCT/JP2014/053156 filed on Feb. 12, 2014 and published as WO 2015 121920 A1 on Mar. 30, 2017.
EP Search Report dated Oct. 28, 2009 in EP Pat App No. 05806844.6 which is EP counterpart of U.S. Appl. No. 12/093,364, filed Nov. 15, 2005.
Extended EP Search Report dated Jun. 24, 2016 in EP Pat App No. 13843227.3 which is EP counterpart of U.S. Appl. No. 14/431,657, filed Mar. 26, 2013.
OA dated May 4, 2020 in U.S. Appl. No. 16/340,871.
OA dated May 13, 2020 in U.S. Appl. No. 16/072,617.
International Search Report dated Jun. 12, 2018 in PCT/JP2018/010980 which published as WO/2019/180806 A1 on Sep. 26, 2019. Submitted in lieu of translation for Frn Pat Doc Cite Nos. 19 and 20; submitted additionally for Frn Pat Doc.
International Preliminary Report on Patentability dated Oct. 15, 2019 in PCT/JP2018/010980 which published as WO/2019/180806 A1 on Sep. 26, 2019. Submitted in lieu of translation for Frn Pat Doc Cite Nos. 19 and 20; submitted additionally for Frn Pat Doc.
Applicant brings to the attention of the Examiner the existence of possibly related U.S. Appl. No. 17/026,175, filed Sep. 19, 2020 and published as US 2021 0003044 A1 on Jan. 7, 2021, which is a bypass CIP of International Application No. PCT/JP2018/010980 filed on Mar. 20, 2018 and published as WO 2019/180806 A1 on Sep. 26, 2019 and as US 2021 0003044 A1 on Jan. 7, 2021, and which has overlapping inventorship/ownership as in the present case.
International Search Report dated Jan. 22, 2019 in PCT/JP2018/041807 which published as WO 2020/100185 A1 on May 22, 2020. Submitted additionally for Frn Pat Doc.
International Preliminary Report on Patentability dated Mar. 10, 2020 in PCT/JP2018/041807 which published as WO 2020/100185 A1 on May 22, 2020. Submitted additionally for Frn Pat Doc.
Applicant brings to the attention of the Examiner the existence of possibly related U.S. Appl. No. 17/317,773, filed May 11, 2021 and published as US 2021 0270154 A1 on Sep. 2, 2021, which is a bypass CIP of International Application No. PCT/JP2018/041807 filed on Nov. 12, 2018 and published as WO 2020/100185 A1 on May 22, 2020, and which has overlapping inventorship/ownership as in the present case.
International Search Report dated Jun. 23, 2020 in PCT/JP2020/014635 which published as WO 2021/199190 A1 on Oct. 7, 2021 and which is the International Application of which the present application is a continuation-in-part. Submitted additionally for Frn Pat Doc.
International Preliminary Report on Patentability dated Mar. 16, 2021 in PCT/JP2020/014635 which published as WO 2021/199190 A1 on Oct. 7, 2021 and which is the International Application of which the present application is a continuation-in-part. Submitted additionally for Frn Pat Doc.
Applicant brings to the attention of the Examiner the existence of possibly related U.S. Appl. No. 09/582,205, filed Jul. 17, 2000 and issued as U.S. Pat. No. 6,378,543 B2 on Apr. 30, 2002, which was the national stage of Intl App No. PCT/JJP1999/00590 filed on Feb. 12, 1999 and published as WO 2000/47876 A1 on Aug. 17, 2000, and which has overlapping inventorship/ownership as in the present case.
Applicant brings to the attention of the Examiner the existence of possibly related U.S. Appl. No. 10/003,202, filed Dec. 6, 2001 and published as US 2002 036280 A1 on Mar. 28, 2002 and issued as U.S. Pat. No. 6,679,478 on Jan. 20, 2004, which was a divisional of U.S. Appl. No. 09/582,205, filed Jul. 17, 2000 and issued as U.S. Pat. No. 6,378,543 B2 on Apr. 30, 2002, which was the national stage of Intl App No. PCT/JP1999/00590 filed on Feb. 12, 1999 and published as WO 2000/47876 A1 on Aug. 17, 2000, and which has overlapping inventorship/ownership as in the present case.
Applicant brings to the attention of the Examiner the existence of possibly related U.S. Appl. No. 12/516,963, filed Oct. 10, 2008 and published as US 2011 0186000 A1 on Aug. 4, 2011 and issued as U.S. Pat. No. 8,230,834 B2 on Jul. 31, 2012, which was the national stage of Intl App No. PCT/JP2008/068498 filed on Oct. 10, 2008 and published as WO 2010/041337 A1 on Apr. 15, 2010, and which has overlapping inventorship/ownership as in the present case.
Applicant brings to the attention of the Examiner the existence of possibly related U.S. Appl. No. 14/361,636, filed Oct. 2, 2012 and published as US 2014 0352803 A1 on Dec. 4, 2014 and issued as U.S. Pat. No. 9,175,788 on Nov. 3, 2015, which was the national stage of International Application No. PCT/JP2012/075452 filed on Oct. 2, 2012 and published as WO 2014054113 A1 on Apr. 10, 2014, and which has overlapping inventorship/ownership as in the present case.
Applicant brings to the attention of the Examiner the existence of possibly related U.S. Appl. No. 14/759,850, filed Mar. 14, 2013 and published as US 2015 0354727 A1 on Dec. 10, 2015 and issued as U.S. Pat. No. 9,611,953 B2 on Apr. 4, 2017, which was the national stage of Intl App No. PCT/JP2013/057133 filed on Mar. 14, 2013 and published as WO 2014 141416 A1 on Sep. 18, 2014, and which has overlapping inventorship/ownership as in the present case.

(56) References Cited

OTHER PUBLICATIONS

Applicant brings to the attention of the Examiner the existence of possibly related U.S. Appl. No. 14/783,492, filed Apr. 11, 2013 and published as US 2016 0053641 A1 on Feb. 25, 2016 and issued as U.S. Pat. No. 9,920,663 B2 on Mar. 20, 2018, which was the national stage of International Application No. PCT/JP2013/060977 filed on Apr. 11, 2013 and published as WO 2014 167694 A1 on Oct. 16, 2014, and which has overlapping inventorship/ownership as in the present case.

Applicant brings to the attention of the Examiner the existence of possibly related U.S. Appl. No. 14/431,657, filed Mar. 26, 2013 and published as US 2015 0240675 A1 on Aug. 27, 2015 and issued as U.S. Pat. No. 9,689,506 on Jun. 27, 2017, which was the national stage of International Application No. PCT/JP2013/058883 filed on Mar. 26, 2013 and published as WO 2014 054302 A1 on Apr. 10, 2014, and which has overlapping inventorship/ownership as in the present case.

Applicant brings to the attention of the Examiner the existence of possibly related U.S. Appl. No. 15/035,955, filed Nov. 21, 2013 and published as US 2016 0256965 A1 on Sep. 8, 2016 and issued as U.S. Pat. No. 9,751,164 B2 on Sep. 5, 2017, which was the national stage of International Application No. PCT/JP2013/081352 filed on Nov. 21, 2013 and published as WO 2015 075795 A1 on May 28, 2015, and which has overlapping inventorship/ownership as in the present case.

Applicant brings to the attention of the Examiner the existence of possibly related U.S. Appl. No. 15/108,470, filed Nov. 21, 2013 and published as US 2016 0326919 A1 on Nov. 10, 2016 and issued as U.S. Pat. No. 10,287,933 B2 on May 14, 2019, which was the national stage of International Application No. PCT/JP2014/083372 filed on Dec. 17, 2014 and published as WO 2015 098643 A1 on Jul. 2, 2015, and which has overlapping inventorship/ownership as in the present case.

Applicant brings to the attention of the Examiner the existence of possibly related U.S. Appl. No. 15/114,460, filed Feb. 10, 2014 and published as US 2016 0356186 A1 on Dec. 8, 2016 and issued as U.S. Pat. No. 9,790,822 B2 on Oct. 17, 2017, which was the national stage of Intl App No. PCT/JP2014/053086 filed on Feb. 10, 2014 and published as WO 2015 118690 A1 on Aug. 13, 2015, and which has overlapping inventorship/ownership as in the present case.

Applicant brings to the attention of the Examiner the existence of possibly related U.S. Appl. No. 15/504,845, filed Oct. 28, 2015 and published as US 2017 0276031 A1 on Sep. 28, 2017 and issued as U.S. Pat. No. 9,840,948 B2 on Dec. 12, 2017, which was the national stage of Intl Appl No. PCT/JP2015/080433 filed on Oct. 28, 2015 and published as WO 2017 072885 A1 on May 4, 2017, and which has overlapping inventorship/ownership as in the present case.

Applicant brings to the attention of the Examiner the existence of possibly related U.S. Appl. No. 15/564,332, filed Jan. 29, 2016 and published as US 2018 0142324 A1 on May 24, 2018 and issued as U.S. Pat. No. 10,316,390 B2 on Jun. 11, 2019, which was the national stage of International Application No. PCT/JP2016/052635 filed on Jan. 29, 2016 and published as WO 2017 130375 A1 on Aug. 3, 2017, and which has overlapping inventorship/ownership as in the present case.

Applicant brings to the attention of the Examiner the existence of possibly related U.S. Appl. No. 16/072,617, filed Jan. 29, 2016 and published as US 2019 0030595 A1 on Jan. 31, 2019 and issued as U.S. Pat. No. 10,710,153 on Jul. 14, 2020, which was the national stage of Intl App No. PCT/JP2016/052636 filed on Jan. 29, 2016 and published as WO 2017 130376 A1 on Aug. 3, 2017 and which has overlapping inventorship/ownership as in the present case.

Applicant brings to the attention of the Examiner the existence of possibly related U.S. Appl. No. 15/540,930, filed Feb. 15, 2016 and published as US 2018 0104730 A1 on Apr. 19, 2018 and issued as U.S. Pat. No. 10,569,318 B2 on Feb. 25, 2020, which was the national stage of Intl App No. PCT/JP2016/054252 filed on Feb. 15, 2016 and published as WO 2017 141305 A1 on Aug. 24, 2017, and which has overlapping inventorship/ownership as in the present case.

Applicant brings to the attention of the Examiner the existence of possibly related U.S. Appl. No. 16/340,871, filed Dec. 5, 2016 and published as US 2019 0240743 A1 on Aug. 8, 2019 and issued as U.S. Pat. No. 10,799,957 B2 on Oct. 13, 2020, which was the national stage of International Application No. PCT/JP2016/086076 filed on Dec. 5, 2016 and published as WO 2018105009 A1 on Jun. 14, 2018, and which has overlapping inventorship/ownership as in the present case.

Web page at http://www.landinst.jp/info/faq/faq3.html as of Aug. 8, 2016 as retrieved from Internet Archive via URL https://web.archive.org/web/20150201000000*/http://www.landinst.jp/info/faq/faq3.html on Feb. 24, 2021.

Web page at http://www.fintech.co.jp/etc-data/housharitsu.htm as of Aug. 8, 2016 as retrieved from Internet Archive via URL https://web.archive.org/web/20161101000000*/http://www.fintech.co.jp/etc-data/housharitsu.htm on Feb. 24, 2021.

* cited by examiner

METHOD FOR MANUFACTURING ENGINE POPPET VALVE

CROSS-REFERENCE TO RELATED APPLICATION, BENEFIT CLAIM, AND INCORPORATION BY REFERENCE

This application is a continuation-in-part of and claims benefit under 35 USC 120 and 365(c) to copending International Application No. PCT/JP2020/014635, entitled "Method for Manufacturing Engine Poppet Valve", filed 30 Mar. 2020, the content of which is incorporated herein in its entirety by reference.

FIELD OF THE INVENTION

Art related to a method for manufacturing an engine poppet valve having a valve head portion and a stem portion made integral by way of a neck portion that increases in diameter as one proceeds toward the tip end.

BACKGROUND

Methods for manufacturing engine poppet valves generally include methods in which, as shown at (a) in FIG. 2 through (d) in FIG. 2 of Japanese Patent Application Publication Kokai No. 2016-47537, the content of which is hereby incorporated herein in its entirety by reference, a stem portion of broadish girth, and a neck portion and valve head portion, are formed from a solid rod, and after forming a hole in the stem portion of broadish girth, diameter is decreased at a location toward the base end portion of the hole to cause an umbrella-shaped hollow valve head portion which follows the contour of the outside diameter of the valve head portion to be formed toward the tip end. Because a hollow valve head portion having an inside diameter that is of flared shape such that it grows wider toward the bottom face of the valve head is capable of containing more coolant than would be the case with a hollow stem portion, this is significant from the standpoint of improving valve head portion cooling efficiency. Furthermore, a hollow valve head portion such as that shown at (d) in FIG. 2 is formed, as described at [0027] of the aforementioned Japanese Patent Application Publication Kokai No. 2016-47537, by causing a semifinished-product blind hole having an inside diameter which is the same as that of the maximum inside diameter of the hollow valve head portion to be formed at the semifinished-product valve stem portion at (c) in FIG. 2 thereof, causing a location toward the base end portion of the semifinished-product valve stem portion to undergo drawing a plurality of times (e.g., 8 to 15 times) while leaving the hollow valve head portion at the tip end of the semifinished-product blind hole until diameter is decreased to the girth of the valve stem portion shown at (d) in FIG. 2 thereof.

On the other hand, PCT/JP2018/041807 (published as WO 2020 100185 A1), the content of which is hereby incorporated herein in its entirety by reference, as shown at (d) in FIG. 1 thereof, discloses a method for manufacturing an engine poppet valve which exhibits a cooling effect that is equivalent to or better than that of an engine valve having a hollow valve head portion as a result of causing a blind hole to be formed at a central location of a stem/head intermediate product having a valve head portion at the tip end of an intermediate stem portion, causing a stepped stem portion comprising a first stem portion formed by using a plurality of rollers (or a rotary swaging technique) to gradually decrease the diameter of a part of the intermediate stem portion from a base end portion and a second stem portion having an outside diameter of larger diameter to be formed at the stem/head intermediate product, causing formation of a second hollow portion that has an inside diameter which is larger than that of a first hollow portion at the interior of the first stem portion to achieve formation of a large contained coolant volume at a location which tends not to be exposed to high temperatures at the interior of the valve head portion, neck portion, and second stem portion which together tend to be exposed to high temperatures, and causing a stepped hollow portion which includes first and second hollow portions to be formed at the interior of the stepped stem portion.

Because the semifinished-product valve stem portion shown at (c) in FIG. 2 of the aforementioned Japanese Patent Application Publication Kokai No. 2016-47537 must be made quite a bit broader in girth than the valve stem portion at (d) in FIG. 2 thereof so as permit formation in such fashion as to leave a hollow valve head portion at the interior of the valve head portion, with the method for manufacturing the hollow poppet valve at the aforementioned Japanese Patent Application Publication Kokai No. 2016-47537 drawing must be carried out repeatedly (e.g., 8 to 15 times) so as to decrease girth of the semifinished-product valve stem portion to that of the stem portion. It is sometimes the case that the drawing that is repeatedly carried out on the semifinished-product valve stem portion worsens (i.e., increases) roughness at the inside wall of the blind hole which is filled with coolant and causes occurrence of cracking at the inside wall of the blind hole. Because the cracking which occurs at the inside wall of the blind hole cannot be visually detected, discovery of defective product and removal thereof has been difficult, and there has been occurrence of problems because this has caused decrease in the efficiency of movement of the coolant with which it is filled.

Furthermore, with the method for manufacturing the hollow poppet valve at the aforementioned PCT/JP2018/041807, regardless of whether the rotary swaging technique or the rolling method employing a plurality of rollers is used, because it has taken time to decrease the diameter of the intermediate stem portion, it occurred to the applicant of the present application that it would be even more desirable if the time to cause decrease in diameter could be reduced and if this could be done using simpler equipment.

There is therefore need for a method for manufacturing an engine poppet valve such as will permit a stepped stem portion which is such that despite formation of a stepped blind hole there is no worsening (i.e., increase) in roughness at an inside wall thereof and there is no occurrence of cracking at the inside wall to be manufactured in a short amount of time using simpler equipment.

SUMMARY OF INVENTION

One or more embodiments of the present invention may address the foregoing and/or other market needs by providing a method for manufacturing an engine poppet valve having a valve head portion and a stem portion made integral by way of a neck portion that increases in diameter toward a tip end, the method comprising a valve head portion manufacturing operation in which hot forging is employed to form a stem/head intermediate product comprising an intermediate stem portion and a valve head portion which is made integral with the intermediate stem portion by way of a neck portion; a stepped stem portion manufacturing operation in which cold drawing in which a part of the intermediate stem portion is inserted in press-fit fashion from a base end portion into a stem member inlet surface and a stem member compressing surface of a hollow circular hole die that has a drawing hole and at which the stem member inlet surface that has a shape that gradually narrows toward a central axis, and the stem member compressing surface that is continuous with a base end portion of the stem member inlet surface and that has a constant inside diameter which is less than an outside diameter of the intermediate stem portion but which is identical to that of the base end portion are provided at least at a portion thereof is employed to cause a stepped stem portion comprising a first stem portion which has been made to be of decreased diameter, a step portion which has been formed by the stem member inlet surface, and a second stem portion at a part in which there is absence of decrease in diameter and which is smoothly continuous by way of the step portion with the first stem portion to be formed from the intermediate stem portion; and a joining operation in which a stem end portion having a same outside diameter as the first stem portion is joined to a base end portion of the first stem portion.

In accordance with some embodiments, decreasing diameter of the first stem portion to cause an intermediate stem portion of a stem/head intermediate product to become a stepped stem portion can be carried out by cold drawing through utilization of a hollow circular hole die having a simple shape.

Furthermore, in accordance with one embodiment, it is preferred that a hollow portion manufacturing operation in which a hole is formed at an interior of the valve head portion, the neck portion, and the intermediate stem portion from a base end portion of the intermediate stem portion of a stem/head intermediate product to form an intermediate hollow portion be carried out after the valve head portion manufacturing operation but before the stepped stem portion manufacturing operation; and that the stem end portion be joined to the base end portion of the first stem portion after a stepped hollow portion formed from the intermediate hollow portion at an interior of the stepped stem portion has been filled with coolant in accompaniment to decrease in diameter of the first stem portion at the stepped stem portion manufacturing operation.

In accordance with some embodiments, a stem/head intermediate product formed by hot forging may be such that the intermediate stem portion is formed so as to be of a girth which is close to the outside diameter of the first stem portion, and by moreover causing the intermediate stem portion in which an intermediate circular hole is formed at a central location to undergo cold drawing through use of a hollow circular hole die, this may be drawn out and extended in the direction of the base end portion as a part toward the base end portion is instantaneously decreased in diameter together with the intermediate circular hole, forming the first stem portion and the first hollow portion. At this time, tensile stresses that act in the axial direction may be produced in the vicinity of the outer circumferential surface of the first stem portion, and compressive stresses that act in the radial direction may be produced in the vicinity of the inner circumferential surface of the first hollow portion.

Furthermore, in accordance with one embodiment, during the cold drawing which may be carried out at the stepped stem portion manufacturing operation in the method for manufacturing the engine poppet valve, it is preferred that the number of times that the part of the intermediate stem portion is inserted in press-fit fashion from the base end portion into the stem member inlet surface and the stem member compressing surface be one.

In accordance with such an embodiment, by causing the intermediate stem portion in which an intermediate circular hole is formed at a central location to undergo cold drawing through use of a hollow circular hole die only one time, the first stem portion and the first hollow portion may be formed. At this time, the tensile stresses that may act in the axial direction in the vicinity of the outer circumferential surface of the first stem portion, and the compressive stresses that may act in the radial direction in the vicinity of the inner circumferential surface of the first hollow portion, would be produced only one time.

Furthermore, in accordance with one embodiment, it is preferred that the method for manufacturing the engine poppet valve be such that the fractional amount by which the outside diameter of the first stem portion is made to be of decreased diameter at the stepped stem portion manufacturing operation is not greater than 25% of that of the second stem portion.

In accordance with such an embodiment, by causing the fractional amount by which the outside diameter of the first stem portion is made to be of decreased diameter to be not greater than 25% of that of the second stem portion which is a part of the intermediate stem portion at which there is absence of decrease in diameter, there may, when the hollow circular hole die is used to decrease diameter to form the first stem portion, be tensile stresses that act in the axial direction which are produced in the vicinity of the outer circumferential surface of the first stem portion, and there may be compressive stresses that act in the radial direction which are produced in the vicinity of the inner circumferential surface of the first hollow portion.

BENEFIT OF INVENTION

By causing a part of an intermediate stem portion to undergo cold drawing through utilization of a hollow circular hole die having a simple shape, methods for manufacturing engine poppet valves in accordance with at least some embodiments of the present invention make it possible to form a stepped stem portion at a stem/head intermediate product in a short amount of time.

Furthermore, because use of a hollow circular hole die to carry out cold drawing in accordance with at least one embodiment causes tensile stresses that act in the axial direction to be produced in the vicinity of the outer circumferential surface of the first stem portion, and causes compressive stresses that act in the radial direction to be produced in the vicinity of the inner circumferential surface of the first hollow portion, the method for manufacturing the engine poppet valve in accordance with such an embodiment may be such that excessive centrally directed compressive forces tend not to act at the first stem portion. Accordingly, such an embodiment may make it possible for to be dramatic reduction in the worsening of roughness that might otherwise occur at the inside wall of the stepped hollow portion which is formed at the interior of the stepped stem portion, and for there to be less tendency for occurrence of cracking.

Furthermore, because it may be the case in accordance with such an embodiment that centrally directed compressive forces will no longer act repeatedly at the first stem portion when cold drawing using a hollow circular hole die is carried out one time, the method for manufacturing the engine poppet valve in accordance with such an embodiment may be such that there will be dramatic reduction in the worsening of roughness that might otherwise occur at the inside wall of the stepped hollow portion which is formed at the interior of the stepped stem portion, and there may be less tendency for occurrence of cracking.

Furthermore, because it may be the case in accordance with some embodiments that carrying out cold drawing through use of a hollow circular hole die will, when a part of the intermediate stem portion is compressed to become the first stem portion, further facilitate dissipation of forces in the axial direction and/or will also further reduce the tendency for centrally directed compressive forces to act thereon, the method for manufacturing the engine poppet valve in accordance with such an embodiment may be such that there will be further reduction in the worsening of (i.e., increase in) roughness that would otherwise occur at the inside wall of the stepped hollow portion which is formed, and may be such that there will be less tendency for occurrence of cracking.

BRIEF DESCRIPTION OF DRAWINGS

Many aspects of the invention can be better understood with reference to the attached drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

A working example of a method for manufacturing a coolant-filled hollow poppet valve for an engine that employs cold drawing at a diameter-decreasing operation will be described in accordance with FIG. 1. At FIG. 1, in describing a hollow poppet valve for an engine, the side toward valve head portion 24 is taken to be the tip end thereof, and the side toward first stem portion 25 is taken to be the base end thereof.

Figure 1:
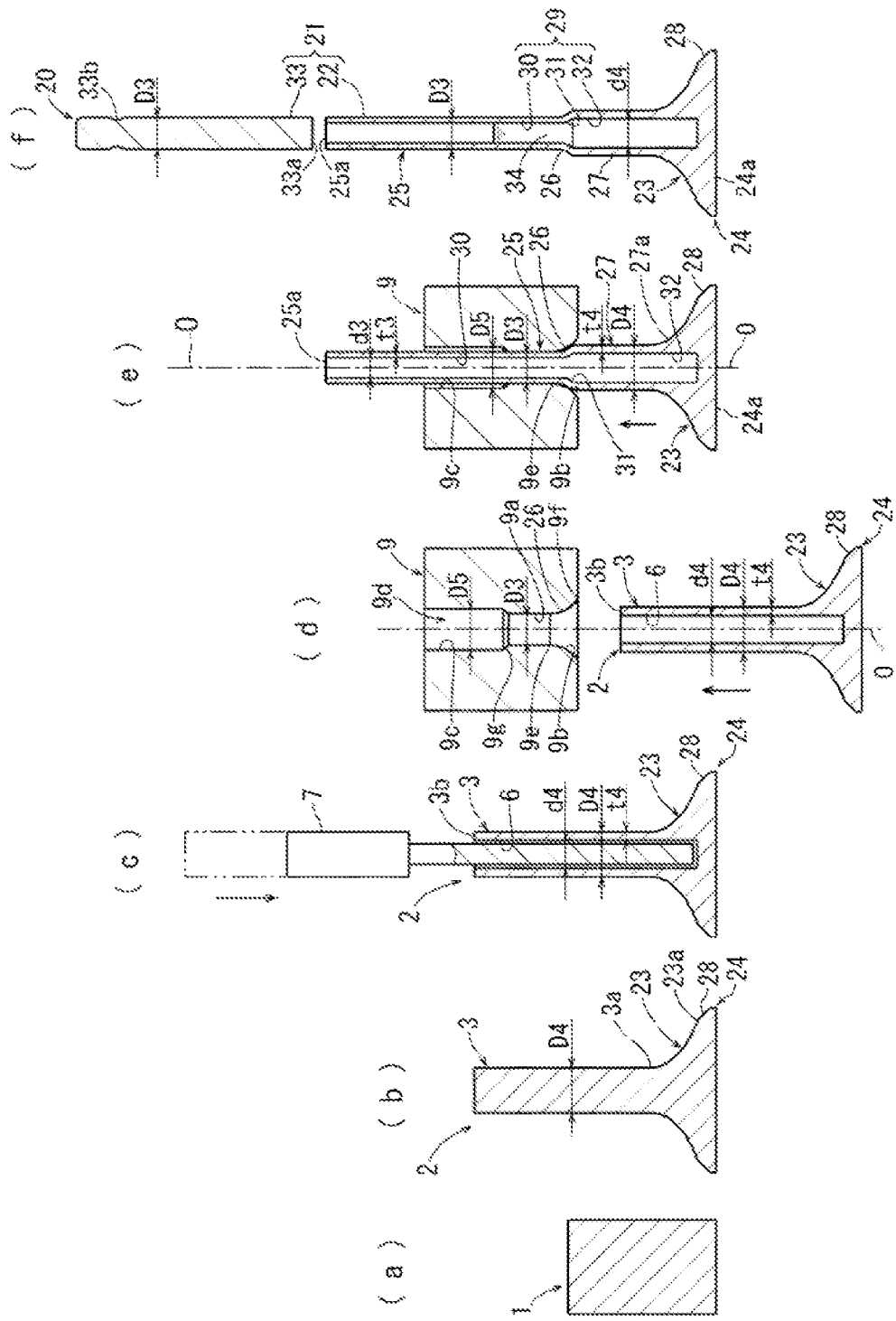
FIG. 1 shows drawings illustrating manufacturing operations related to a working example of a method of manufacturing an engine poppet valve, (a) showing a solid rod serving as material for a valve; (b) showing a valve head portion manufacturing operation in which hot forging is employed to form a stem/head intermediate product comprising an intermediate stem portion and a valve head portion which is made integral with the intermediate stem portion by way of a neck portion; (c) showing a hollow portion manufacturing operation in which a hole is formed in the stem/head intermediate product and an intermediate hollow portion is formed; (d) being a sectional view showing a hollow circular hole die used in a stepped stem portion manufacturing operation and the stem/head intermediate product before the diameter of the intermediate stem portion is decreased; (e) showing a stepped stem portion manufacturing operation in which cold drawing is employed to decrease the diameter of a part of the intermediate stem portion; and (f) showing a joining operation in which a stepped hollow portion formed from the intermediate hollow portion is filled with coolant and is joined to a stem end portion.

Metal rod 1 at (a) in FIG. 1 is formed from rod stock comprising an alloy or the like having high heat resistance such as SUH35 (an austenitic steel having high heat resistance) which is of high heat resistance. Hot forging operations are employed to cause metal rod 1 to be made into stem/head intermediate product 2 of shape such that valve head portion 24, neck portion 23, and intermediate stem portion 3 shown at (b) in FIG. 1 are formed in integral fashion. Stem/head intermediate product 2 may be formed by causing metal rod 1 to be heated to on the order of 900° C. to 1300° C. and subjected to hot upset forging and/or hot extrusion forging in which it is sequentially extruded by a plurality of dies of gradually differing shape (not shown). As repeated hot forging of stem/head intermediate product 2 will improve the workability of the intermediate stem portion during formation of the first stem portion, this is advantageous in that it permits elimination of superfluous operations.

Stem/head intermediate product 2 at (b) in FIG. 1 is formed in such shape as to have intermediate stem portion 3 which is cylindrically shaped with outside diameter D4; neck portion 23 which is of concavely curved shape and which is smoothly continuous with tip end 3a of intermediate stem portion 3 such that the outside diameter thereof gradually increases as one proceeds toward the tip end; and valve head portion 24 which is continuous with tip end portion 23a of neck portion 23 and which has at an outer circumferential surface thereof a face portion 28 that tapers so as to be of flared shape such that it grows wider as one proceeds from a location toward the base end to a location toward the tip end. Furthermore, where needed, intermediate stem portion 3 may be cut flush and made shorter, and the respective outer circumferential surfaces of neck portion 23 and intermediate stem portion 3 may be lapped.

A hollow portion manufacturing operation in which a hole is formed at a central location of intermediate stem portion 3 from the base end portion 3b thereof causes formation at stem/head intermediate product 2 of intermediate hollow portion 6 of inside diameter d4 shown at (c) in FIG. 1. Intermediate hollow portion 6 is formed by using a cutting tool such as a deep hole drilling machine 7 to carry out cutting at the base end portion 3b of intermediate stem portion 3, intermediate stem portion 3 being formed as a cylindrical region having wall thickness t4. Intermediate hollow portion 6 is formed so as to be coaxial with stem/head intermediate product 2, and is formed so as to be in the shape of a circular hole that is closed at one end and that extends along a region at the interior of intermediate stem portion 3 and neck portion 23 and valve head portion 24. Note that the hollow portion manufacturing operation shown at (c) in FIG. 1 may be omitted so as to permit manufacture of a solid valve.

At the stepped stem portion manufacturing operation as shown at (d) in FIG. 1 and at (e) in FIG. 1, at stem/head intermediate product 2, a part of intermediate stem portion 3 is subjected to cold drawing to cause formation of stepped stem portion 22, described below, and of stepped hollow portion 29 toward the interior therefrom. More specifically, stem/head intermediate product 2 having intermediate hollow portion 6 is such that a part of intermediate stem portion 3 may be inserted in press-fit fashion from base end portion 3b into stem member inlet surface 9b, described below, formed toward the tip end of hollow circular hole die 9 while stem/head intermediate product 2 is in an unheated state. Hollow circular hole die 9 has drawing hole 9d comprising relieved portion 9c, stem member inlet surface 9b, and stem member compressing surface 9a, which respectively have cross-sections perpendicular to central axis 0 that are circular. Stem member inlet surface 9b is of convexly curved shape—i.e., although concave in the sense that it is an inlet, stem member inlet surface 9b is described herein as being of convexly curved shape inasmuch as the surface profile thereof deviates from conical by bulging inward toward central axis 0—being of flared shape such that it grows wider as one proceeds in the direction from base end portion 9e toward tip end portion 9f, base end portion 9e being continuous with the tip end of stem member compressing surface 9a which is of constant inside diameter. Provided by way of increasing diameter portion 9g at the base end portion of stem member compressing surface 9a is relieved portion 9c which has an inside diameter that is constant and that is larger than that of the stem member compressing surface. Note that stem member inlet surface 9b, instead of being of convexly curved shape, may be formed so as to be of tapered shape such that it is of flared shape and/or such that it is of concavely curved shape.

As shown at (d) in FIG. 1, inside diameter D3 of stem member compressing surface 9a at hollow circular hole die 9 is formed so as to be smaller than outside diameter D4 of intermediate stem portion 3 at stem/head intermediate product 2, and inside diameter D5 of relieved portion 9c is formed so as to be larger than inside diameter D3 of stem member compressing surface 9a. As shown at (e) in FIG. 1, during the stepped stem portion manufacturing operation, with stem/head intermediate product 2 in a state such that it is arranged so as to be coaxial (central axis 0) with hollow circular hole die 9, a part of intermediate stem portion 3 is sequentially inserted in press-fit fashion into stem member inlet surface 9b and stem member compressing surface 9a of hollow circular hole die 9 from base end portion 3b. That part of intermediate stem portion 3 which is inserted in press-fit fashion into stem member compressing surface 9a is such that formed thereat is first stem portion 25, the diameter of which is decreased from outside diameter D4 to D3, first stem portion 25 being such that while being formed so as to have wall thickness t3 that is less than wall thickness t4 of intermediate stem portion 3 it is drawn out and extended toward relieved portion 9c along central axis 0 and it is pressed into stem member inlet surface 9b, causing it to be formed so as to be smoothly continuous with second stem portion 27, which is made up of a region in which there is absence of decrease in diameter, by way of step portion 26 which is formed so as to be of concavely curved shape that narrows as one proceeds from a location toward the tip end in a direction toward the base end. As a result of providing relieved portion 9c which is continuous with a location toward the base end portion of stem member compressing surface 9a, and as a result of reducing contact area between intermediate stem portion 3 and stem member compressing surface 9a during cold drawing and reducing the force required to carry out drawing, first stem portion 25 can be drawn out and extended in the direction of the base end portion without occurrence of buckling. During the stepped stem portion manufacturing operation, intermediate stem portion 3 of stem/head intermediate product 2 is made to take the form of stepped stem portion 22 which is made up of first stem portion 25, step portion 26, and second stem portion 27.

Furthermore, as shown at (e) in FIG. 1, during the stepped stem portion manufacturing operation, first hollow portion 30 having inside diameter d3, the diameter of which has been decreased so as to be less than inside diameter d4 of intermediate stem portion 3, is formed at the interior of first stem portion 25; and decreasing diameter portion 31, which is formed so as to be of convexly curved shape that narrows as one proceeds from a location toward the tip end in a direction toward the base end, is formed at the interior of step portion 26. First hollow portion 30 is smoothly continuous by way of decreasing diameter portion 31 with second hollow portion 32 which is defined at the interior of second stem portion 27 which is a region in which there is absence of decrease in diameter, and tip end portion 27a of second stem portion 27 is smoothly continuous with neck portion 23. First hollow portion 30, decreasing diameter portion 31, and second hollow portion 32 constitute stepped hollow portion 29 formed at the interior of stepped stem portion 22.

As shown at (d) in FIG. 1 and at (e) in FIG. 1, note that it is more preferred that the cold drawing which is carried out at a location toward the base end portion of intermediate stem portion 3 be carried out only one time than that this be carried out a plurality of times. Stating this another way, it is preferred that first stem portion 25 be formed by causing a location toward the base end portion of intermediate stem portion 3 to undergo cold drawing only one time. Where first stem portion 25 is formed from intermediate stem portion 3 by causing it to undergo cold drawing only one time, it will no longer be repeatedly acted on by centrally directed compressive forces. As a result, because there will be dramatic reduction in the worsening of roughness that would otherwise occur in accompaniment to radially directed compressive forces acting on first hollow portion 30 of stepped hollow portion 29 at the interior of stepped stem portion 22, cracking will tend not to occur at the inside wall of first hollow portion 30.

Moreover, so as to prevent occurrence of working-related problems such as cracking or buckling at first stem portion 25 regardless of whether cold drawing is carried out one time or a plurality of times, it is preferred that the fractional amount by which the outside diameter of first stem portion 25 which is formed as a result of decrease in the diameter of second stem portion 27 is decreased be not greater than 25% of the outside diameter of second stem portion 27, and it is more preferred that this be not less than 3% but not greater than 12%. To this end, it is preferred that, relative to the outside diameter of intermediate stem portion 3 at stem/head intermediate product 2, i.e., relative to outside diameter D4 of second stem portion 27, inside diameter D3 of stem member compressing surface 9a of hollow circular hole die 9 shown at (d) in FIG. 1 be formed so as to cause $D3 \leq (1-0.25) \times D4 = 0.75 \times D4$, and it is more preferred that this be formed so as to cause $(1-0.12) \times D4 = 0.88 \times D4 \leq D3 \leq (1-0.03) \times D4 = 0.97 \times D4$.

Figure 2:
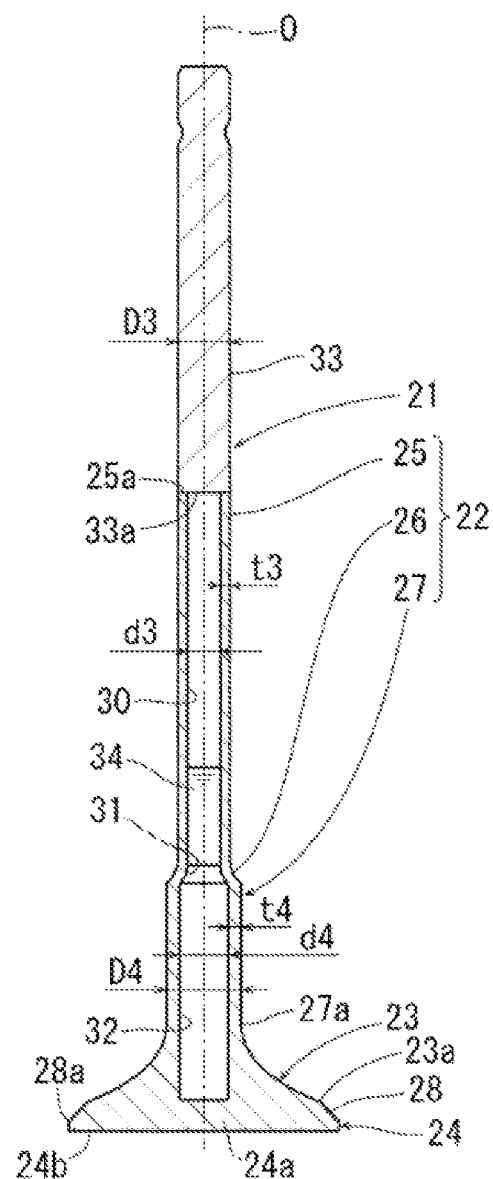
FIG. 2 shows an axial sectional view of an engine poppet valve manufactured by the manufacturing method in accordance with a working example.

In accordance with the stepped stem portion manufacturing operation shown at (d) in FIG. 1 and at (e) in FIG. 1, the fact that it is possible to cause intermediate stem portion 3 of stem/head intermediate product 2 to be formed at stepped stem portion 22 by cold drawing utilizing hollow circular hole die 9 means that there will be less tendency for occurrence of deformation in the direction of base end portion 25a and the work hardening regarding which there may be concern could occur as a result of repeated drawing such as that which is carried out at the semifinished-product valve stem portion shown at (c) in FIG. 2 of the aforementioned Japanese Patent Application Publication Kokai No. 2016-47537 during forging of first stem portion 25 at stepped stem portion 22, as a result of which there will be dramatic reduction in the worsening of (increase in) roughness that would otherwise occur at the inside wall of the stepped hollow portion and there will be less tendency for occurrence of cracking at the interior. Furthermore, at the outer circumferential surface of first stem portion 25 as well, roughness is not increased but is held to a low value, and finishing operations are made less inconvenient. Furthermore, especially where stepped stem portion 22 is formed by carrying out cold drawing one time, stem/head intermediate product 2 at (e) in FIG. 1 has the advantage that this will result in increased hardness and increased strength.

Moreover, at the stepped stem portion manufacturing operation, decrease in diameter of the first stem portion shown at (e) in FIG. 1 may be carried out while this is in a state such that a cemented carbide rod (not shown) made up of a solid rod which has outside diameter D3 and which is of higher hardness than intermediate stem portion 3 has been inserted in advance within intermediate hollow portion 6 of stem/head intermediate product 2 shown at (d) FIG. 1.

Furthermore, as shown at (f) in FIG. 1, at the joining operation, while in a state such that a region constituting a part of stepped hollow portion 29 is filled with metallic sodium or other such coolant 34, stem end portion 33 which is formed from a stem member made of metal is joined to base end portion 25a of first stem portion 25. The material of stem end portion 33 is formed from solid rod stock of outside diameter D3 comprising SUH11 (a heat-resistant martensitic steel which is based on chrome and silicon and/or carbon but which has lower heat resistance than SUH35) or other such heat-resistant alloy or the like, tip end portion 33a being joined by means of friction welding or the like to base end portion 25a of first stem portion 25. Stepped stem portion 22 is such that stem portion 21 is formed together with stem end portion 33, stem end portion 33 being joined during the joining operation to stepped stem portion 22, at which neck portion 23 and valve head portion 24 are formed in integral fashion, to form hollow engine poppet valve 20 shown in FIG. 2. Following the joining operation, after causing cotter groove 33b to be provided at stem end portion 33, hollow poppet valve 20 is made to undergo any necessary annealing, grinding, nitride treatment, and/or the like.

In accordance with the method for manufacturing the engine poppet valve of the working example, at the hollow portion manufacturing operation at (c) in FIG. 1, the fact that the hole forming procedure which is necessary for forming stepped hollow portion 29 that is to be filled with coolant 34 is not carried out from the side of valve head portion 24 which is toward the bottom face 24a thereof causes the number of times that a hole must be formed to be reduced from multiple times to a single time. Furthermore, because the manufacturing method of the working example causes the sealing procedure involving joining of a cap (not shown) that would otherwise be carried out in accompaniment to the procedure for forming a hole at bottom face 24a of valve head portion 24 to be unnecessary, the fact that the high-cost/high-precision procedure by which the cap would otherwise need to be joined thereto and the procedure by which strength of bottom face 24a would otherwise need to be maintained through use of cutting procedures to increase the precision with which the cap joint portion at the bottom face of the valve would otherwise need to be finished are made unnecessary makes it possible to manufacture an engine poppet valve at low cost.

Moreover, in accordance with the method for manufacturing the engine poppet valve of the working example, when the coolant-filled poppet valve that is manufactured is used as an engine exhaust valve, causing inside diameter d4 of second hollow portion 32 that is provided at the interior of valve head portion 24, neck portion 23, and second stem portion 27 which are exposed to the high-temperature exhaust gas in the exhaust passages and combustion chamber of the engine to be greater than inside diameter d3 of first hollow portion 30, increasing the volume of second hollow portion 32 defined at the interior of second stem portion 27 which is exposed to high temperatures, and increasing the amount of coolant 34 with which this is capable of being filled permits manufacture of a hollow engine poppet valve 20 in which transfer of heat from the exhaust gas in the exhaust passages and combustion chamber, not shown, to coolant 34 can be carried out in smooth fashion. Furthermore, because when coolant 34 to which heat has been transferred at the interior of second hollow portion 32 sloshes back and forth in parallel fashion with respect to the valve central axis 0, decreasing diameter portion 31 which is formed so as to be of convexly curved shape (or concavely curved shape or tapered shape) that smoothly connects the first and second hollow portions (30, 32) promotes smooth movement between it and first hollow portion 30, this permits manufacture of a hollow engine poppet valve 20 at which there is improved ability to transfer heat from coolant 34 to stem portion 21. Hollow poppet valve 20 makes it possible to improve the efficiency with which coolant 34 moves between valve head portion 24 and stem portion 21, as a result of which it will be possible to achieve a cooling effect that is equivalent to or better than that of a coolant-filled hollow-head valve which does not incorporate the foregoing features of the present working example during low and/or medium rotational speeds of the engine.

Figure 3:
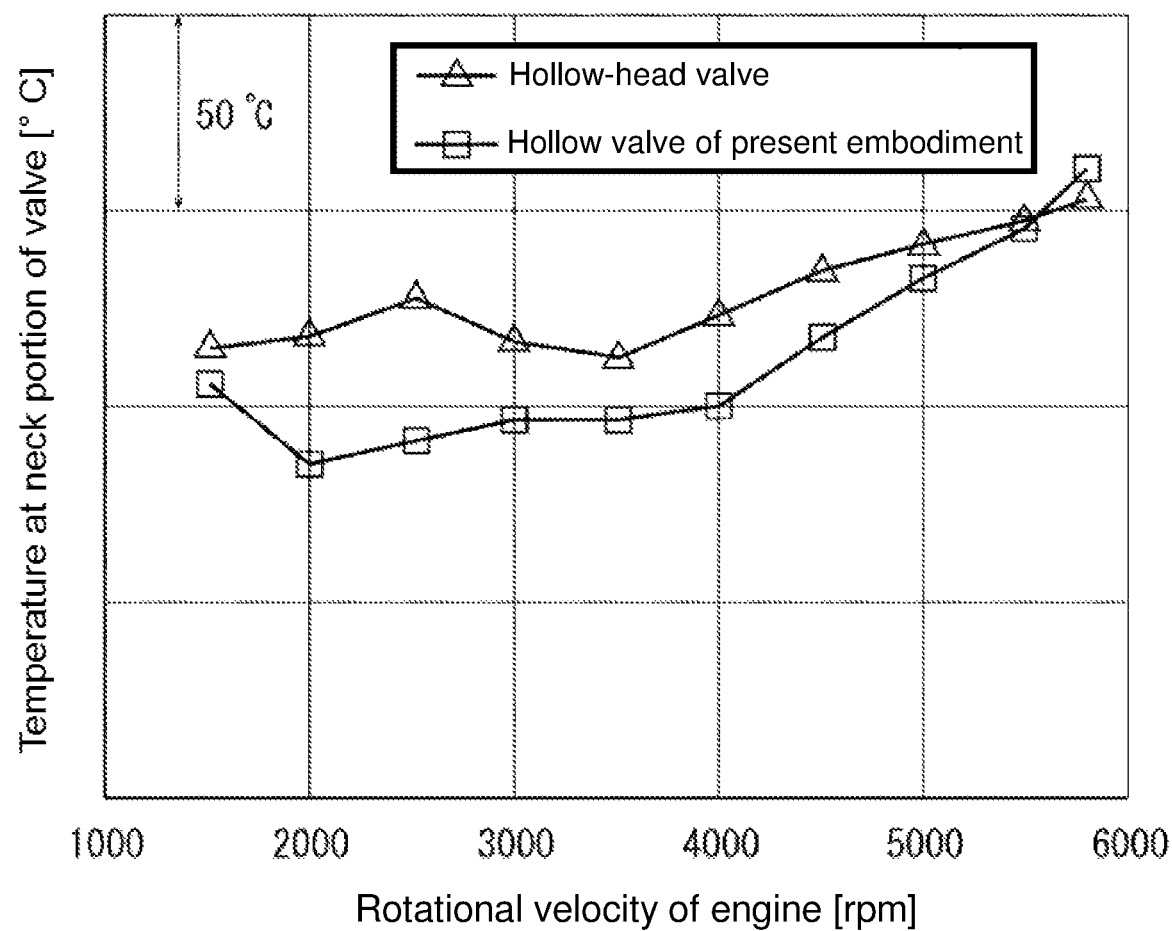
FIG. 3 is a graph which shows results of measurement of temperature at a hollow poppet valve for an engine in accordance with a working example, and which is a graph of the valve neck portion.

Referring to FIG. 3, description will be given with regard to the temperature at neck portion 23 of the valve as a function of the rotational speed of an engine employing a coolant-filled hollow poppet valve 20 manufactured by the manufacturing method of the first working example (see FIG. 2) when measured by the thermocouple method. FIG. 3 is a graph of valve neck portion 23. The graph has a horizontal axis indicative of the rotational speed (rpm) of the valve, a vertical axis indicative of temperature (° C.), a line of triangles indicative of the temperature of a coolant-filled hollow-head valve which did not incorporate the foregoing features of the present working example (referred to at FIG. 3 as simply a "hollow-head valve" as distinct from the "coolant-filled hollow poppet valve of present working example"), and a line of squares indicative of the temperature of a coolant-filled hollow valve in accordance with the present working example.

At FIG. 3, the temperature at the neck portion of the coolant-filled hollow poppet valve of the present working example was more or less on par with or somewhat below the temperature of a coolant-filled hollow-head valve which did not incorporate the foregoing features of the present working example when engine rotational speed was 1500 rpm. On the other hand, for engine rotational speeds exceeding 1500 rpm but not greater than 2000 rpm, whereas temperature at the neck portion of the hollow-head valve which did not incorporate the foregoing features of the present working example was more or less flat or rose somewhat, temperature at the neck portion of the hollow poppet valve of the present working example fell, being much lower than that of the hollow-head valve which did not incorporate the foregoing features of the present working example at 2000 rpm, and exhibiting particularly superior effect at the point where lowest.

Furthermore, for engine rotational speeds exceeding 2000 rpm but not greater than 3000 rpm, there was a gentle increase in temperature at the neck portion of the coolant-filled hollow poppet valve of the present working example but this was much lower than that of the coolant-filled hollow-head valve which did not incorporate the foregoing features of the present working example; and for engine rotational speeds exceeding 3000 rpm but not greater than 4000 rpm, temperature at the neck portion of the hollow poppet valve of the present working example trended more or less flat while remaining much lower than the hollow-head valve which did not incorporate the foregoing features of the present working example.

In addition, for engine rotational speeds exceeding 4000 rpm but not greater than 5500 rpm, temperature at the neck portion of the coolant-filled hollow poppet valve of the present working example gradually rose, approaching the temperature of the neck portion of the coolant-filled hollow-head valve which did not incorporate the foregoing features of the present working example, and being the same temperature as that of the hollow-head valve which did not incorporate the foregoing features of the present working example when at 5500 rpm.

Thus, based upon the results of measurement in FIG. 3, the coolant-filled hollow poppet valve of the present working example exhibited the most superior effect—the temperature at the neck portion thereof falling when the temperature at the neck portion of the coolant-filled hollow-head valve which did not incorporate the foregoing features of the present working example was flat—when engine rotational speed was low, i.e., above 1500 rpm but not greater than 2000 rpm. Furthermore, the coolant-filled hollow poppet valve of the present working example was such that temperature at the neck portion of the hollow poppet valve of the present working example exhibited superior effect in that it remained much lower than that of the hollow-head valve which did not incorporate the foregoing features of the present working example—rising but doing so only gently (2000 rpm to 3000 rpm) or while trending flat (3000 rpm to 4000 rpm)—when engine rotational speed was moderately low, i.e., above 2000 rpm but not greater than 4000 rpm.

Furthermore, temperature at the neck portion of the coolant-filled hollow poppet valve of the present working exhibited superior effect in that even though it rose it remained lower than the temperature at the neck portion of the coolant-filled hollow-head valve which did not incorporate the foregoing features of the present working example when engine rotational speed was moderately high, i.e., above 4000 rpm but less than 5500 rpm.

Inasmuch as a coolant-filled hollow engine poppet valve manufactured in accordance with the manufacturing method of the present working example exhibited superior cooling effect that was equivalent to or better than a coolant-filled hollow-head valve which did not incorporate the foregoing features of the present working example not only when engine rotational speed was moderately low, i.e., not less than 1500 rpm but not greater than 3000 rpm, but also when rotational speed was moderately high, i.e., above 3000 rpm but less than 5500 rpm, it is fair to say that it would have improved knock resistance and would contribute to improvement in fuel efficiency.

Metallic sodium which is in general use as a coolant for hollow valves in accordance with the present invention has a melting point of 98° C. Because a coolant-filled hollow valve exposed to heat from the combustion chamber during low and/or medium rotational speeds of an engine will not reach a temperature as high as it would during high-speed rotation, metallic sodium with which a hollow valve which does not incorporate the foregoing features of the present working example may be filled and which may serve as coolant within the hollow portion thereof will, when it moves from the high-temperature region at the interior of the neck portion and/or valve head portion that is exposed to the combustion chamber to a region in the vicinity of the stem end portion at which temperature is lower because it is not exposed to the combustion chamber, tend to be cooled to the melting point or lower and may thus adhere at a region in the vicinity of the stem end portion, which may cause movement thereof to be hindered, as a result of which there is a possibility that there may be deterioration in ability of the valve to cause dissipation of heat from the valve head portion and/or neck portion to the stem portion. However, with a coolant-filled hollow valve manufactured in accordance with the present working example, the inside diameter of first hollow portion 30 which is near stem end portion 33 is less than the inside diameter of second hollow portion 32, and so even if coolant 34 were to adhere at a region in the vicinity of stem end portion 33 at the interior of first hollow portion 30, because the amount thereof that would adhere thereat would be less and because there would be less deterioration in ability to dissipate heat, it is thought that this is what makes it possible for reduction in the temperature of the valve to still occur even when the engine is operating in the low and/or medium rotational speed range. Moreover, with a coolant-filled hollow poppet valve in accordance with the present working example, it is thought that there would be greater reduction thereof than there would be with a hollow-head valve which does not incorporate the foregoing features of the present working example even when the engine is operating in the medium and/or high rotational speed range.

For this reason, it is fair to say that a coolant-filled hollow poppet valve for an engine which is manufactured in accordance with the manufacturing method of the present working example is superior in that not only will it exhibit a most superior cooling effect when employed in an engine that operates only in the low and/or medium rotational speed range such as a special-purpose engine for generating electric power for use by the drive motor of an electric vehicle, but also in that it will exhibit superior cooling effect when employed in the drive engine itself of a vehicle or the like.

EXPLANATION OF REFERENCE NUMERALS

2 Stem/head intermediate product
3 Intermediate stem portion
3*b* Base end portion
6 Intermediate hollow portion
9 Hollow circular hole die
9*a* Stem member compressing surface
9*b* Stem member inlet surface
9*d* Drawing hole
9*e* Base end portion
20 Hollow poppet valve
22 Stepped stem portion
23 Neck portion
24 Valve head portion
25 First stem portion
25*a* Base end portion
26 Step portion
27 Second stem portion
33 Stem end portion
34 Coolant
D3 Inside diameter of stem member compressing surface and outside diameter of first stem portion
D4 Outside diameter of second stem portion
0 Central axis of poppet valve and of stem/head intermediate product

What is claimed is:

1. A method for manufacturing an engine poppet valve having a valve head portion and a stem portion made integral by way of a neck portion that increases in diameter toward a tip end, the method for manufacturing the engine poppet valve characterized in that it comprises:
- a valve head portion manufacturing operation in which hot forging is employed to form a stem/head intermediate product comprising an intermediate stem portion and a valve head portion which is made integral with the intermediate stem portion by way of a neck portion;
- a hollow portion manufacturing operation in which a hole is formed at an interior of the valve head portion, the neck portion, and the intermediate stem portion from a base end portion of the intermediate stem portion of the stem/head intermediate product to form an intermediate hollow portion;
- a stepped stem portion manufacturing operation in which cold drawing in which a part of the intermediate stem portion is inserted one time in press-fit fashion from a base end portion into a stem member inlet surface and a stem member compressing surface of a hollow circular hole die that has a drawing hole and at which the stem member inlet surface that has a shape that gradually narrows toward a central axis, and the stem member compressing surface that is continuous with a base end portion of the stem member inlet surface and that has a constant inside diameter which is less than an outside diameter of the intermediate stem portion but which is identical to that of the base end portion are provided at least at a portion thereof is employed to cause a stepped stem portion comprising a first stem portion which has been made to be of decreased diameter, a step portion which has been formed by the stem member inlet surface, and a second stem portion at a part in which there is absence of decrease in diameter and which is smoothly continuous by way of the step portion with the first stem portion to be formed from the intermediate stem portion and to cause a stepped hollow portion to be formed from the intermediate hollow portion at an interior of the stepped stem portion in accompaniment to decrease in diameter of the first stem portion; and
- a joining operation in which a stem end portion having a same outside diameter as the first stem portion is joined to a base end portion of the first stem portion after the stepped hollow portion has been filled with coolant.

2. The method for manufacturing the engine poppet valve according to claim 1 characterized in that a fractional amount by which an outside diameter of the first stem portion is made to be of decreased diameter at the stepped stem portion manufacturing operation is not greater than 25% of that of the second stem portion.

3. The method for manufacturing the engine poppet valve according to claim 1 characterized in that a fractional amount by which an outside diameter of the first stem portion is made to be of decreased diameter at the stepped stem portion manufacturing operation is not less than 3% but not greater than 12% of that of the second stem portion.

* * * * *